United States Patent Office 3,024,660
Patented Mar. 13, 1962

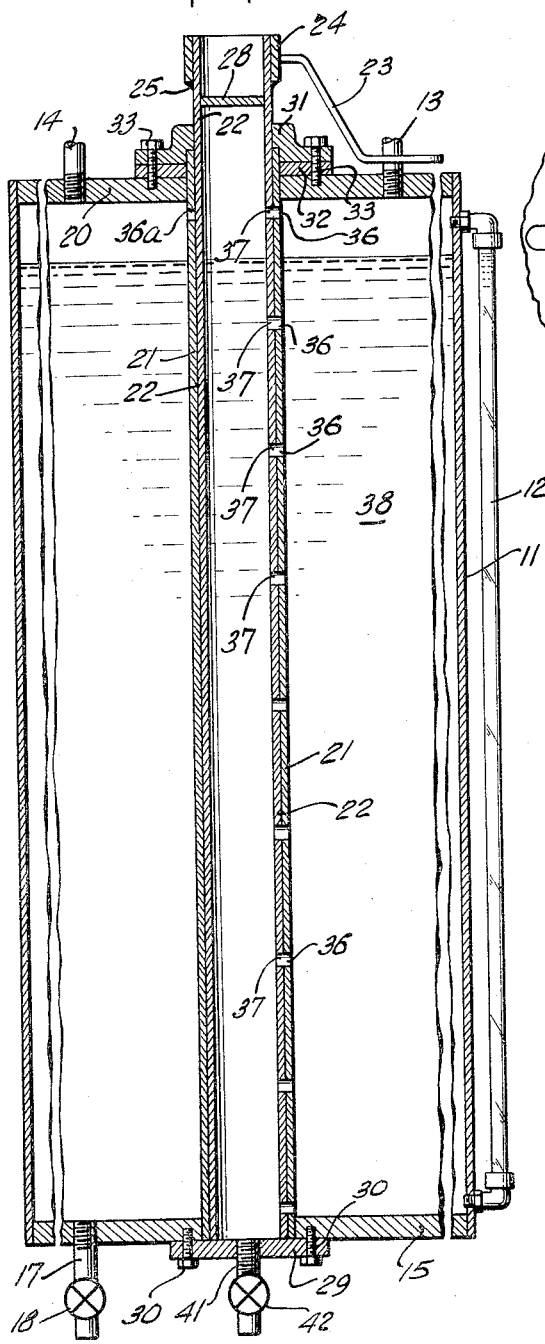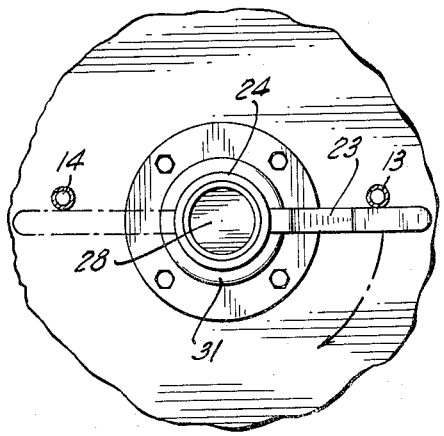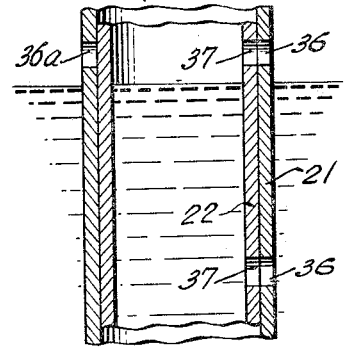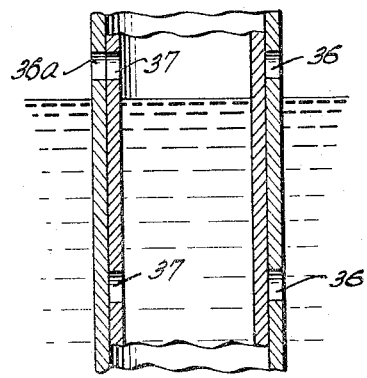

3,024,660
FLUID SAMPLING APPARATUS
Charles E. B. Tothill, El Campo, Tex., assignor to Texaco Inc., a corporation of Delaware
Filed Aug. 5, 1958, Ser. No. 753,273
3 Claims. (Cl. 73—424)

This invention is concerned with an apparatus for fluid sampling. More specifically, the invention concerns apparatus for sampling a body of liquid wherein the characteristics are apt to vary along some particular dimension of the body of liquid.

Although the invention is not limited thereto, it is most directly concerned with petroleum pipeline operations, and the description will be directed to such use.

In the production of crude oil, the most common situation is one where the oil is first collected from a group of wells in a storage tank. Thereafter it may be pumped out in measured quantities to be sold for processing. The operation of delivering a given quantity of the crude oil in this manner includes a metering of the oil that is being delivered, both as to quantity and quality. Such a metering ordinarily involves standing for a given period of time, so that a check on the consistency of the oil may be made, as well as a measurement of the quantity thereof. In making such a check on the consistency of the oil, it is necessary to endeavor to take a representative sample from the quantity of oil that is to be delivered. In order for such a sample to be accurately representative, it should include a sample core of the oil, taken from the whole body of liquid, all the way from the top to the bottom.

Heretofore, in taking a sample of a quantity of oil that is to be delivered from a container, as indicated above, one method has been to lower a tube into the body of liquid from the top, in order to obtain the sample desired. Such a procedure has the failings of causing eddy currents in the liquid, and other disturbances, so that the oil withdrawn within the tube (from such a sample) does not truly represent a core, or cross section, of the body of oil.

Consequently, it is an object of this invention to provide apparatus for taking a truly representative sample of a body of liquid, which sample has the same consistency as the liquid, over the full dimension along which variations occur, e.g. from top to bottom.

Another object of the invention is to provide a method and apparatus for taking a representative sample of a body of fluid which overcomes drawbacks of the prior art.

Briefly, this invention is concerned with a sampler for liquid that is standing in a tank, and that has a consistency that may vary from top to bottom thereof. Such a sampler includes an upstanding tube that extends from top to bottom of the tank. The sampler also includes a liquid passage through a wall of said tube for admitting the liquid into the interior of the tube over the full height of the liquid. The sampler also includes a second tube concentric with said upstanding tube and in sliding contact therewith, in order to maintain a liquid tight seal therebetween. The sampler also includes a second liquid passage through a wall of said second tube and corresponding with the first named liquid passage, in order that said liquid may flow freely into the interior of said tubes when the liquid passages are in alignment. In addition, the sampler includes means for moving one of said tubes relative to the other, in order to misalign said liquid passages; and also it includes means for draining the liquid from the interior of said tubes, after isolation thereof by a misalignment of said passages. All of the elements of the sampler act together to obtain a truly representative sample of said liquid.

The foregoing and other objects and benefits of the invention will be more fully appreciated in connection with the more detailed description which follows, and which is illustrated in the drawings in which:

FIG. 1 is a longitudinal cross section view of a tank of liquid showing a sampler according to the invention, located therein;

FIG. 2 is an enlarged detail plan view showing the handle and an alternative position therefor;

FIG. 3 is an enlarged fragmentary cross section view, showing the concentric tubes of the fluid sample column in the position for allowing free lateral communication between the body of liquid in the tank and the column of liquid within the tubes; and, FIG. 4 is an enlarged fragmentary cross section view similar to FIG. 3, but showing the elements in the opposite position, ready for the sample to be drawn off.

Referring to FIGS. 1–4 it will be observed that there is illustrated a tank 11, which is shown laterally broken off, indicating that the horizontal dimesions may extend in varying degrees beyond that shown. In accordance with the above indication, this invention is being illustrated in connection with its use for petroleum pipeline operations, connected with crude oil deliveries from a metering tank or the like. Thus, tank 11 is a measured volume tank; and the procedure employed for delivering a quantity of crude oil to a customer includes the filling of tank 11 to a predetermined level, which may be measured in any convenient manner such as by means of a gauge glass 12 illustrated. In the illustrated tank 11 there is included an inlet pipe 13 for the crude oil that is to be measured prior to delivery, and there is a similar pipe 14 connected to the top of tank 11, for application of pressurized gas, since in this case the system is one that maintains above atmospheric pressure on the liquid crude oil. At the bottom of the tank 11 and threadably attached through a bottom wall 15 thereof, there is an outlet pipe 17 for removing the metered quantity of oil, following its measurement and sample check for quality. There is included a valve 18 connected to pipe 17 for controlling the withdrawal of the oil from tank 11.

Conveniently located within the body of tank 11, there is a pair of concentric tubes 21 and 22. The outer tube 21 of this pair is fastened in a fluid-tight manner to the bottom 15 of tank 11 and also to a top wall 20 thereof, as illustrated. Inner concentric tube 22 fits with a fluid tight sliding fit within tube 21, so as to permit rotation of the tube 22 as desired, by means of a handle 23 that is attached to the top of tube 22 in any feasible manner. It will be observed that the manner of attaching handle 23 that is illustrated includes a collar 24 that is welded, as at reference number 25, to the outside of tube 22 at the top extremity thereof.

Inside of the tube 22 near the top thereof, there is a partition 28 that closes off the interior of the tube 22 in order to maintain the pressure that is on the system. The outer tube 21 may be fastened to the tank 11 in any convenient manner, e.g. by means of a bottom plate 29 that is bolted onto the bottom 15 of tank 11 by means of bolts 30, illustrated. Similarly, at the top of the tank, tube 21 is securely clamped in place by means of a collar 31 and a washer 32 thereunder, with a plurality of bolts 33 that are threaded into the top 20 of tank 11.

It will be observed that there are a plurality of passages 36 through the outer tube 21. These passages or holes 36 extend in a line over the full height of the tank 11. Also, there are a corresponding plurality of passages or holes 37 through the inner tube 22, and located so that they are in alignment with the passage 36 when handle 23 is in the illustrated postion. It will be clear that these liquid passages will permit free lateral flow of a liquid 38 that is within the tank 11. In this manner, when the passages 37 are positioned in alignment with the passages 36 the liquid 38 will fill up the columnar space within inner tube 22. This will provide a representative core, or sample, of the entire body of liquid 38 as it stands within the tank 11 at any given time.

Now when it is desired to take a sample of the liquid 38 for a qualitative determination, the handle 23 will be rotated one hundred and eighty degrees to the opposite position (indicated in dashed lines in FIG. 2) and the passages 37 will be rotated therewith to the opposite side of tube 21 so that the column of the liquid 38 that is within the tube 22 will be effectively isolated.

There is an additional passage, or opening 36a located near the top of the outer tube 21, but on the opposite side from the plurality of passages 36. This passage 36a becomes aligned with the uppermost passage 37 (of the passages through inner tube 22) when the tube 22 is rotated to its isolating position, as described above. The purpose for this passage 36a is merely that of maintaining the same gas pressure on the isolated sample column of liquid, as exists on the main body of liquid 38 in the tank 11.

Located at the bottom of the column of liquid within the tubes 21 and 22, attached by being threaded through a hole in the plate 29, there is an outlet pipe 41 which has a valve 42 connected thereto for controlling the drain-off of liquid from the inside of tube 22.

It will be clear that the procedure to be followed for obtaining a truly representative sample of the body of liquid 38 will include the following: valve 42 and valve 18 will be closed while the oil to be metered and checked is introduced via the inlet pipe 13. While it is thus introduced, the handle 23 will be in the position illustrated, so that all of the passages 37 are in alignment with passages 36. Now following a filling of the tank 11 to a predetermined level, e.g. in order to measure a given quantity, the oil is allowed to stand for a given period of time in order to provide for a predetermined settling time to stabilize the characteristics of the oil that is to be delivered to a customer. At the end of such settling time handle 23 will be rotated clockwise when viewed from above, i.e. in the direction of the arrow shown in FIG. 2, to the dashed line position indicated which is one hundred and eighty degrees from its original location. This will rotate the tube 22 the same amount and thus misalign the passages 37 from the corresponding passages 36 of the stationary tube 21. Next, following such isolation of a sample column of the liquid 38, the valve 42 may be opened to allow this sample column of oil to be drained off for a qualitative check on the desired constituency or necessary standards to be met by the quantity of oil that is being delivered to a customer. It will be noted that during the carrying out of this procedure, the system pressure is maintained on the sample as well as the body of liquid 38. Thus, only hydrostatic head differentials are involved as the sample of oil is withdrawn for test.

There may be a pressure relief valve (not shown) attached to the top of the tank 11, if desired, in order to guard against excessive pressure in the tank.

It is pointed out that, while the structure shown in FIG. 1 illustrates a manual handle arrangement for positioning the inner tube 22, this is not necessarily the only structure that could be employed. For example, it is contemplated that a motorized mechanical linkage (not shown) could be employed in order to provide for remote control, or automatic control of the sampling method.

It is pointed out in addition, that the volume of a sample to be taken, may be determined by the dimension of the sampling tube structure employed. Furthermore, different volumes for a given sampling structure could be had by providing inner tubes of different wall thicknesses. The different wall thicknesses would make different cross section areas for the columns of liquid therein so that the volumes would vary correspondingly.

Also, it is to be noted that many different structural shapes could be employed for the openings that allow passage of the liquid between the sampling column and the main body of liquid being sampled. In addition, it is contemplated that the location of the sampling tubes relative to the tank in each case, could be varied as desired. But, these locations are preferably situated such that the most representative core or sample of liquid will be obtained.

Although the embodiment illustrated and described above moves the inner tube relative to the tank while the outer tube remains fixed, it will be clear that the outer tube could be made movable while the inner tube remained fixed.

While a certain embodiment of the invention has been shown and described in some detail in accordance with the applicable statutes, this is not to be taken as in any way limiting the invention but merely as being descriptive thereof.

It is claimed:

1. A sampler for liquid standing in a pressurized tank having an inlet for gas under pressure located at the top of the tank, said liquid having a consistency that may vary from top to bottom thereof as it stands in said tank, comprising in combination an upstanding tube extending from top to bottom of said tank, a first liquid passage through a wall of said tube, effectively extending over the full height of said liquid for permitting free flow of said liquid therethrough at substantially all levels of said liquid, a second tube concentric with said upstanding tube and in sliding contact therewith to maintain a liquid tight seal therebetween, a second liquid passage through a wall of said second tube corresponding with said first named liquid passage in order that said liquid may flow freely into the interior of said tubes when said liquid passages are in alignment, means for sliding the inner one of said tubes relative to the outer tube in order to misalign said liquid passages and isolate the column of liquid within, means for closing the top of the inner one of said tubes to maintain the pressure in said tank, an additional passage through the wall of the outer one of said tubes and located above a predetermined highest level of said liquid when the tank is filled to such level, said additional passage being spaced from the liquid passage in said outer one of said tubes so that when said first and second liquid passages are misaligned the liquid passage of said inner one of said tubes will be aligned with said additional passage to maintain the system pressure on the isolated column of liquid, and means for draining the liquid from the interior of said tubes after isolation thereof by the misalignment of said passages to obtain a truly representative sample of said liquid.

2. A sampler for liquid standing in a pressurized tank having an inlet for a gas under pressure located at the top of the tank, said liquid having a consistency that may vary from top to bottom thereof as it stands in said tank, comprising in combination an upstanding cylindrical tube extending from top to bottom of said tank, a first liquid passage through a wall of said tube effectively extending over the full height of said liquid for permitting free flow of said liquid therethrough at substantially all levels of said liquid, a second tube concentrically located within said upstanding tube and in sliding contact therewith to maintain a liquid tight seal therebetween, said second tube extending above the top of said tank, means for closing the top of said second tube to maintain the pressure in said tank, a second liquid passage through a wall of said second tube and corresponding with said first named liquid passage in order that said liquid may flow freely into the interior of said tubes when said liquid passages are in alignment, a handle attached to the top of said second tube for rotating same to misalign said liquid passages and isolate the column of liquid within, an additional passage through the wall of said first named tube, said additional passage being located above a predetermined highest level of said liquid when the tank is filled to such level and located circumferentially spaced from said first passage so that when said second tube is rotated to misalign said first and second passages said second passage will be aligned with said additional passage to maintain the system pressure on said isolated column of liquid, and means for draining the liquid from the interior of said tubes after isolation thereof by the misalignment of said passages to obtain a truly representative sample of said liquid.

3. A sampler for liquid standing in a pressurized tank having an inlet for a gas under pressure located at the top of the tank, said liquid having a consistency that may vary from top to bottom thereof as it stands in said tank, comprising in combination an upstanding cylindrical tube extending from top to bottom of said tank, a plurality of first liquid passages spaced vertically apart through a wall of said tube and extending over the full height of said liquid for permitting free flow of said liquid therethrough at substantially all levels of said liquid, a second tube concentrically located within said upstanding tube and in sliding contact therewith to maintain a liquid tight seal therebetween, said second tube extending above the top of said tank, means for closing the top of said second tube to maintain the pressure in said tank, a plurality of second liquid passages spaced vertically apart through a wall of said second tube and corresponding with said first liquid passages in order that said liquid may flow freely into the interior of said second tube when said passages are in alignment, a radially extending handle attached to the top of said second tube for rotating same to misalign said liquid passages and isolate the column of liquid within, an additional passage through the wall of said first named tube located above a predetermined highest level of said liquid when the tank is filled to such level and located circumferentially spaced from said plurality of liquid passages so that when said second tube is rotated to misalign said first and second passages the uppermost one of said second passages will be aligned with said additional passage to maintain the system pressure on said isolated column of liquid, and means for draining the liquid from the interior of said tubes after isolation thereof by the misalignment of said passages to obtain a truly representative sample of said liquid.

References Cited in the file of this patent

UNITED STATES PATENTS

| | | |
|---|---|---|
| 732,059 | Dyer | June 30, 1903 |
| 823,986 | Bartram | June 19, 1906 |
| 1,156,240 | McKay | Oct. 12, 1915 |
| 2,185,651 | Sollie | Jan. 2, 1940 |
| 2,906,126 | Brown | Sept. 29, 1959 |

FOREIGN PATENTS

| | | |
|---|---|---|
| 564,683 | Great Britain | Oct. 9, 1944 |